(12) United States Patent
Rasmussen et al.

(10) Patent No.: US 8,690,140 B2
(45) Date of Patent: Apr. 8, 2014

(54) FIXTURE FOR GRIPPING AN END OF A MEMBER

(75) Inventors: Kent Lykke Rasmussen, Varde (DK); Bo Michel, Fanø (DK)

(73) Assignee: Vestas Wind Systems A/S, Aarhus N. (DK)

( * ) Notice: Subject to any disclaimer, the term of this patent is extended or adjusted under 35 U.S.C. 154(b) by 979 days.

(21) Appl. No.: 12/224,014

(22) PCT Filed: Feb. 13, 2006

(86) PCT No.: PCT/IB2006/050467
§ 371 (c)(1),
(2), (4) Date: Jun. 3, 2010

(87) PCT Pub. No.: WO2007/093854
PCT Pub. Date: Aug. 23, 2007

(65) Prior Publication Data
US 2010/0266420 A1    Oct. 21, 2010

(51) Int. Cl.
*B23Q 3/00* (2006.01)
*B60P 3/40* (2006.01)

(52) U.S. Cl.
USPC ............................................. 269/296; 410/44

(58) Field of Classification Search
USPC .................. 29/281.1; 269/289 R; 211/85.18; 248/644, 200.1; 410/32, 33, 42, 44, 45, 410/46, 47; 416/244 R
See application file for complete search history.

(56) References Cited

U.S. PATENT DOCUMENTS

| | | | |
|---|---|---|---|
| 2,725,241 A * | 11/1955 | Leonard, Jr. | 410/44 |
| 6,543,368 B1 * | 4/2003 | Forbes | 105/396 |
| 6,966,722 B1 * | 11/2005 | Borror et al. | 403/3 |
| 7,210,882 B2 | 5/2007 | Anderson | |
| 2004/0217037 A1 | 11/2004 | O'Kane | |

FOREIGN PATENT DOCUMENTS

| | | |
|---|---|---|
| DE | 3416375 A1 | 11/1985 |
| EP | 1849719 A | 10/2007 |
| WO | 2004041589 A | 5/2004 |
| WO | 2006000230 A | 1/2006 |

OTHER PUBLICATIONS

PCT Search Report & Written Opinion for priority application PCT/IB2006/050467, mailing date Jun. 11, 2008.

\* cited by examiner

*Primary Examiner* — Lee D Wilson
*Assistant Examiner* — Jamal Daniel
(74) *Attorney, Agent, or Firm* — Wood, Herron & Evans, LLP

(57) ABSTRACT

A fixture to be connected to an end of a large member, such as wind turbine blade and wind turbine tower sections is provided. The fixture allows for a high degree of flexibility with regard to size of the end and arrangement of holes in the flange of the member.

28 Claims, 9 Drawing Sheets

A)

B)

A)

B)

FIXTURE FOR GRIPPING AN END OF A MEMBER

TECHNICAL FIELD OF THE INVENTION

The invention relates to transportation of large and heavy members having an end, such as a wind turbine tower section or a wind turbine blade. More particularly, the invention relates to a fixture for facilitating handling of large members in relation to long distance transportation by, for example, sea or train, where reloading from one type of transportation to another is foreseen.

BACKGROUND OF THE INVENTION

Tower sections for state of the art wind turbines may have cylindrical or slightly conical end faces with a flange having a plurality of holes for fastening sections together on the site of application. The tower sections typically have an outer diameter in the order of about 2 to 5 meters, a weight of about 10 to 80 tonnes and a length of 10 to 50 meters, even though in some cases values higher that these may be utilised. Fixation and handling during transportation is hence far from trivial. In most cases, several types of transportation are required since manufacturing of tower sections takes place in centralised facilities. Therefore, the transportation will typically involve two or more types of transportation by sea, rail and road and hence reloading of the tower sections, which is far from trivial due to the size and weight of the sections.

EP 1303447 discloses a device for handling wind turbine tower sections. Four gripping appliances are connected to the flange of the tower section and the gripping appliances are thereafter connected to either an adapter with four container corners or to a further gripping appliance and tower section. The gripping appliances are dedicated to one single tower diameter and one single separation between holes in the flange of the tower.

Other appliances using gripping appliances which are dedicated to one single arrangement of holes in a flange of a tower section or a wind turbine root are disclosed in U.S. Pat. No. 6,983,844 and WO 2004/041589.

OBJECTS OF THE INVENTION

It is the object of the invention to provide an improved fixture for large members having an end.

DISCLOSURE OF THE INVENTION

The above and other objects of the invention are realised by a fixture for gripping an end of a member, such as a wind turbine tower section, a wind turbine blade or blade section or a wind turbine hub or hub section. In principle, other bulky members may be connected or gripped to the fixture, but the fixture is particularly advantageous for handling of members having a substantially annular end of the member and having a flange with holes near the end, such as wind turbine blades (the root part) and wind turbine tower sections. For wind turbine tower sections, the fixture is further advantageous in that wind turbine tower sections typically are slightly conical and hence previously required dedicated gripping arrangements at each end and for each section to fit the holes of the flange. The end of the member to the fixture may be annular, partially annular and having a sharp edge or the end may be irregular.

The fixture has an axial control means for preventing horizontal movement of the end of the member relative to the fixture in a direction orthogonal to the end of the member when the fixture is installed on the member. It should be observed that relevant members are of substantial size, such as 10 to 50 meters long and weighing 10 to 80 tonnes.

The term during use refers to the situation when the fixture is connected to the end of the member to be handled and the fixture is standing on the foot part or the connectors. This corresponds to the orientation when the fixture is connected to a transportation means, such as a truck, a train wagon or a ship. Similarly, the term horizontal and vertical also refers to the arrangement of when the fixture is standing on the foot part or on the connectors and the fixture being connected to the end of the member. Orthogonal to the end of the member therefore corresponds to a direction, which is parallel to the direction orthogonal to the part of the axial control means facing the member during use.

The orientation of the fixture may be defined by a line between two of the at least two connectors (see below). In other words, for members having an end of the member, "orthogonal to the fixture" corresponds to a direction parallel to the axis of rotation of the substantially annular end of a wind turbine tower section, when the section is connected to the member.

The fixture also comprises a cross-positioning means for positing the end of the member relative to the fixture during application of the fixture to the end of the member with regard to a direction corresponding to a horizontal direction parallel to the end of the member during use.

Furthermore, at least two connectors adapted for connecting the fixture to an external structure other than the end of the member are provided on the fixture. Such external structure may, for example, be a train freight wagon, a truck, a ship or a container. The connectors are preferably standard container corners, as this provides a high flexibility when handling and connecting the fixture during transportation.

In the axial control means, a first opening and a second opening are arranged, and at least two locker elements are slideably arranged in the first and second openings. Furthermore, the locker elements have at least one through hole. This hole is used for connecting the fixture to the member for example with a bolt and nut to a flange of a wind turbine tower section. Other types of connecting means than a bolt and nut may also be utilised in some cases. Examples are clamps or temporary welds connecting the locker elements to the member. However, the use of bolt and nut to connect the fixture to the member is highly advantageous over the other examples as this involves a simple and yet fast and secure means for connecting the fixture to the member.

Another aspect of the invention concerns a frame particularly adapted to be connected to a fixture according to the first aspect of the invention to form a unit, which may hold two or more members, preferably one per frame. The frame has a first end part and a second end part, and the first end part and second end part are adapted to be connected to a fixture according to the first aspect of the invention. The connection between the fixture and the frame may be permanent, but it is highly preferred that the connection is only temporary and may be broken, for example, by disengaging standard connectors such as container corners by twist locks or bridge couplings.

The first end part and the second end part are separated by a distance larger than the diameter or height of the end of the member to be gripped by the fixture during use. Typically, the separation distance is about 2.5 to 5 meters. The end parts are connected rigidly by at least one connector spar to keep the desired separation between the end parts.

The frame further has at least two external connectors such as standard container corners capable of being engaged by twist locks or bridge couplings, and the connectors are arranged with a distance corresponding to a standard container, such as a standard 40-foot container. Finally, the frame has a through slit arranged in a spar between the first end part and the second end part, the slit extending at least 50% of the distance between the first end part and the second end part. Typically, the spar extends from the first end part to the second end part even if the slit only goes from, for example, the middle between the end parts to the upper end. The slit is adapted to receive a locking fixture to be arranged slideably in the slit, so that the locking fixture may slide vertically when the frame is installed.

Further aspects of the invention relate to combinations with a fixture and particularly advantageous uses of the fixture.

BRIEF DESCRIPTION OF THE DRAWINGS

The invention will be explained more fully below with reference to exemplary embodiments as well as the drawings, in which.

All the figures are highly schematic and not necessarily to scale, and they show only parts which are necessary in order to elucidate the invention, other parts being omitted or merely suggested.

DESCRIPTION OF THE DRAWINGS

The invention is particularly advantageous to large cylindrical members and members having a substantially annular end, but the invention may also be used in connection with other large members having an end. Examples are wind turbine tower sections and wind turbine blades. One of the main purposes of the invention is that the fixture is allowed to follow the member from the manufacturing plant all the way to the deployment site. The fixture will in other words not be removed from the member when reloading from one type of transportation to another. This is the reason for the requirement that the connectors are standard type connectors, such as standard container corners, and that the connectors are separated by a standard distance, for example corresponding to a standard 8, 15, 20, 40 or 45 foot container. All in all this saves quite a lot of time.

Figure 1:
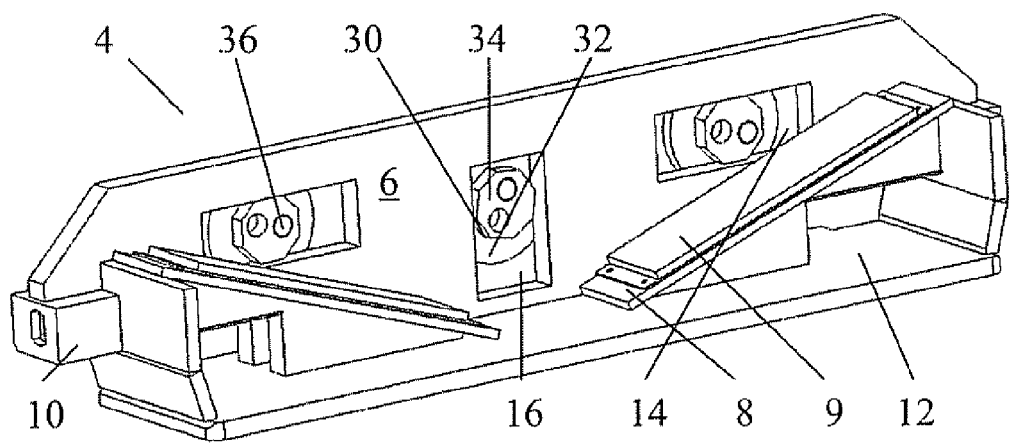
FIG. 1 shows the fixture from the side to be arranged towards the end of the member to be connected.

The fixture 4 in FIG. 1 represents the best mode of the invention known to the inventors. The fixture 4 has an axial control means 6, which is a substantially flat plate.

Figure 5:
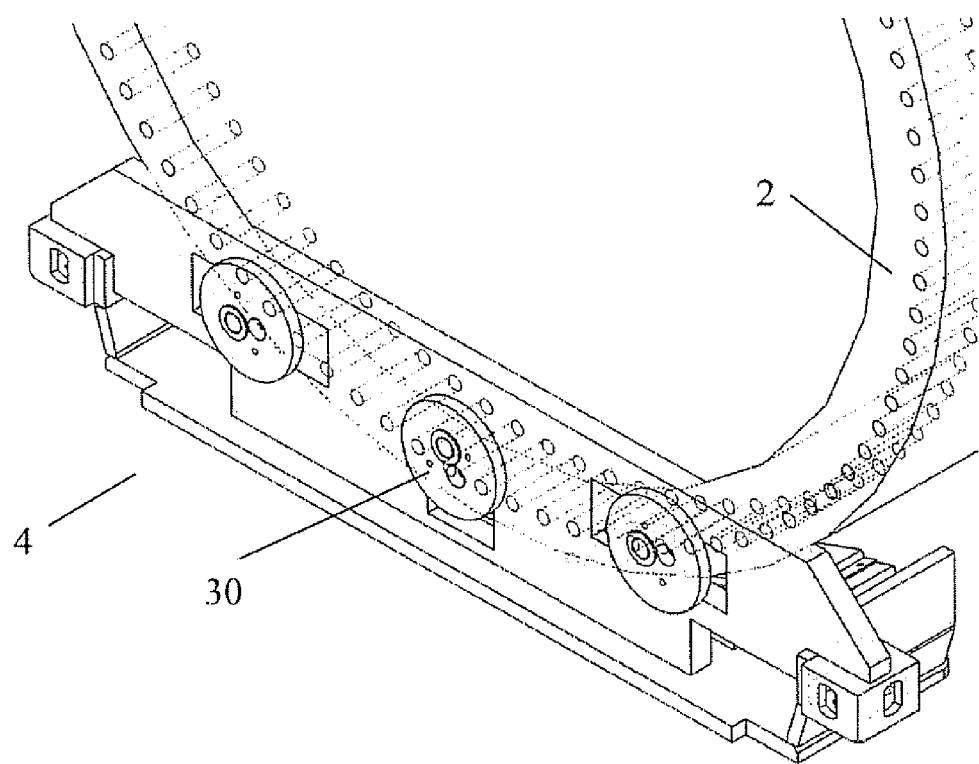
FIG. 5 shows a partially transparent view of a member arranged in the fixture.

During use, the end of the member 2 (see e.g. FIG. 5) is arranged directly towards the axial control means 6 so that the axial control means is parallel to the end of the member 2. If corrosion is expected to take place in the interface between the member and the fixture, an electrically isolating member (not shown) may be arranged between the axial control means 6 and the member. The main purpose of the axial control means 6 is to stop the member 2 from moving further in the direction of the axial control means and it may hence take other shapes, such as one or more spar(s) or T-bars. However, the plate-shaped axial control means is highly advantageous due to the simple design and the high in-plane strength.

Element 8 in FIG. 1 is the cross-positioning means. The main purpose of this element is to bring the member to a stable position during the application of the fixture 4 to the member 2. Furthermore, the cross-positioning means may also aid in transferring the load of the member to the axial control means and/or to the foot 12. Since the member is typically very heavy, it is highly preferred to utilise gravity for the adjustment to the desired position. In FIG. 1, gravity is utilised in that the member will slide or role towards the centre (the desired position) as seen in the horizontal plane parallel to the end of the end of the member (corresponding to the plane of the axial control means 6) upon positioning of the member 2 at the fixture 4. The cross-positioning movement is restricted by the two slides 8 facing downwards towards the desired position (here, the centre) of the fixture. Typically, the centre is the most desired position, as this leads to a balanced combination of fixture and member for rotational symmetrical members.

Figure 3:
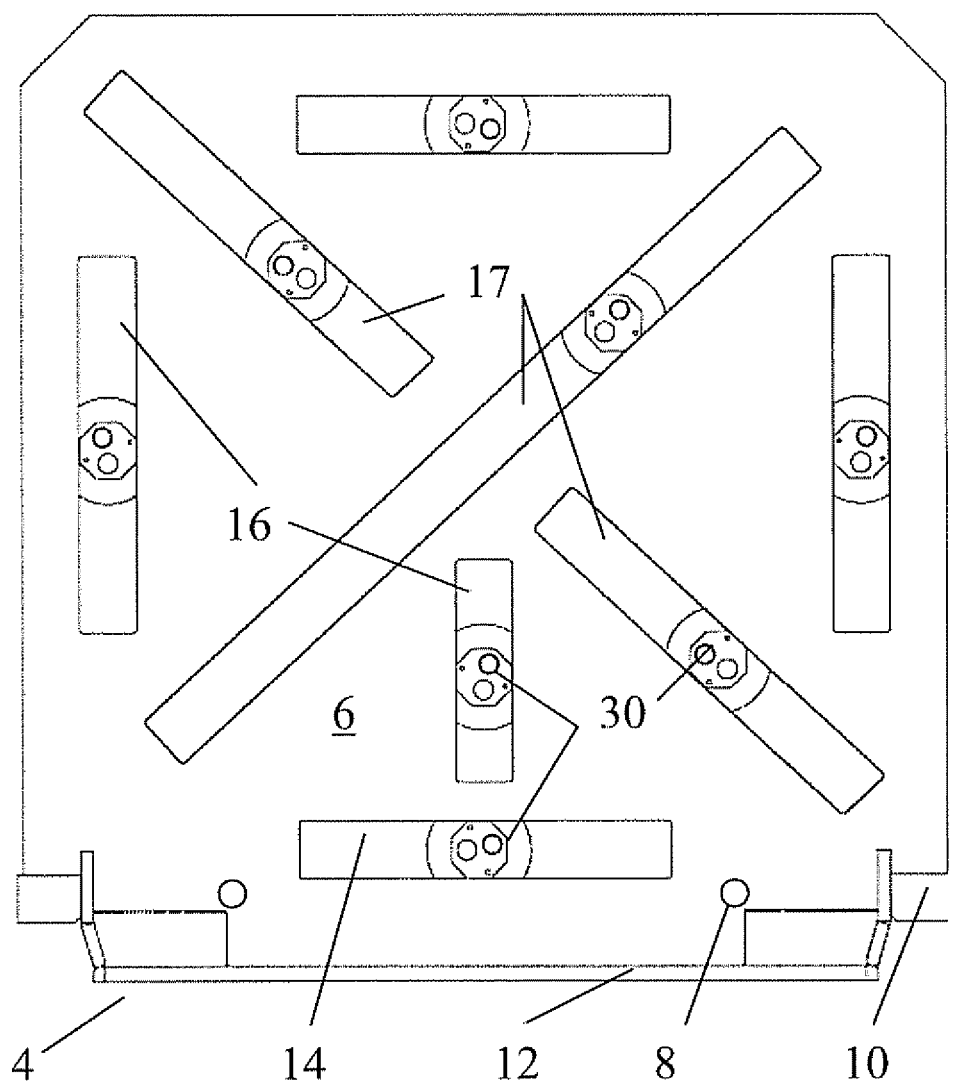
FIG. 3 shows another fixture from the side to be arranged towards the end of the member.

Other examples of preferred embodiments of the cross-positioning means are two protruding members arranged with a horizontal distance and facing towards the member during application of the fixture. An example of this embodiment is shown in FIG. 3. In this case, the end of the member will be trapped between the protruding members. This embodiment is particularly advantageous in being very simple and saving material and hence weight.

In a further preferred embodiment, the cross-positioning means comprises a protruding upwardly opened semicircle with a radius of curvature larger than the end of the member. By semicircle is here meant that the protruding part forms a part of a circle but this part need not form exactly half a circle but it may for example be a quarter of a circle or another fraction of a circle. Therefore, the end of the member will slide or role towards the lowest part of the semicircle during application of the fixture.

The semicircle cross-positioning means is particularly advantageous in that the further away from the desired position that the member is placed, the more forceful is the gravity in driving it to the desired position. Furthermore, the semicircle cross-positioning means is also particularly advantageous for members having a substantially annular end.

The preferred embodiment of the cross-positioning means depend on the shape of the end of the member to be connected to the fixture. For a substantially annular end, the slides as shown in FIG. 1 is preferred whereas for ends with an edge and irregular ends, the embodiment having two protruding parts may be most advantageous.

When the end of the member 2 is gripped or affixed to the fixture 4, the load is carried by one or more parts of the fixture and bolts connecting the member to the fixture. The main purpose of the bolts is to keep the end of the member affixed to the fixture and prevent movement relative to the fixture (in corporation with various parts of the fixture.

It was found to be highly desirable for the cross-positioning means to comprise a further part 9 on the face of the cross-positioning means 8 to be connected to the member. This is due to the fact that the side of the member will be in contact with the cross-positioning means during application of the fixture and most likely also during subsequent transportation. The further part 9 may have several purposes. Firstly, it may prevent scratching of the member, thereby reducing the likelihood of requiring repainting after transportation. Secondly, it may reduce the effect of vibration or impact during application, transportation and handling of the member. Thirdly, it may be isolate the member electrically from—at least a part of the fixture—and thereby reduce corrosion. In a highly preferred embodiment, the further part is a textile, paint or a rubber based member.

In a highly preferred embodiment, the further part 9 is a relatively hard rubber-based material. One example of a suitable material is a rubber having a shore A hardness of about 80, such as 75 to 85 and a thickness of about 20 mm, such as 10 to 30 mm. If a softer rubber-based material is utilised it is preferred that the thickness of the further part 9 is smaller.

One of the main advantages of the present invention is that the fixture is mounted on the member at the site of manufacturing and thereafter is fixed to the member all the way to the site of deployment of the member. This allows for a highly improved efficiency in reloading of the member, as the fixture is equipped with standard connectors, such as standard container corners. The connectors are therefore advantageously of a standard type used for containers. Examples of connectors are standard container corners to be engaged by for example twist locks or bridge couplings. At least some of the connectors should likewise be arranged separated by a distance corresponding to a standard used in transportation or handling, for example, by sea or train.

Figure 2:
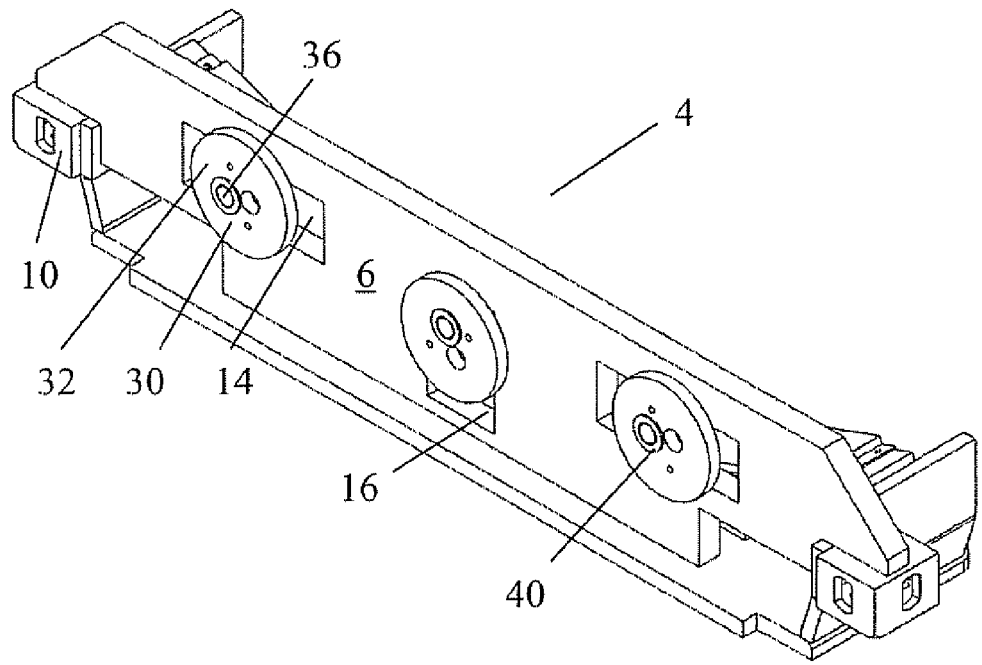
FIG. 2 shows the fixture from the side to be arranged away from the end of the member.

A first opening 14 and a second opening 16 are arranged in the axial control means 6 as shown in FIG. 1, FIG. 2 and FIG. 3. The openings are for receiving locker elements 30 to be arranged slideably therein. The advantage of the slideable engagement with the locker elements 30 is that the locker elements 30 may be shifted slightly so that a through hole 36 in the locker element 30 will fit a hole in the flange of the end of the member 2. This is highly advantageous, as it allows for the fixture to be applied for a range of end shapes and particularly various annular diameters and flange arrangements and not just one fixed arrangement of holes in the member or one fixed flange arrangement. This flexibility is particularly important in the event of members with slightly conical shape, such as wind turbine tower sections. This is for example evident from FIG. 7B, where two tower sections 2 with fixtures 4 and frames 50 are arranged (middle section is removed). It is observed that the difference in diameter for each tower section is considerable, and without the flexibility realised by the present invention, several dedicated fixtures would be required leading to logistic problems when the range of tower sections is considered.

In addition to the overall principle to encompassing several different annular radii and flange configurations, a number of particularly advantageous embodiments have been identified by the inventors.

It was found that the flexibility is further increased by having more than one through hole 36 in the locker element 30. In FIG. 1 and FIG. 2, a locker element 30 having two holes 36 is shown. Experimental work has shown that even though more than two through holes in the locker element 30 may be applied, two holes usually provide the best compromise between strength of the locker element and flexibility with regard to fitting the holes of the flange of the member.

The flexibility may be further increased, if a hole 36 is arranged asymmetrically. By asymmetrically is meant that for one hole, the hole is not arranged in the centre of the locker element. For two or more holes, the greatest flexibility with regard to asymmetrical arrangement of the holes is realised if the holes are arranged with different distance to the centre and/or not arranged with 180° between the holes. This is particularly relevant when a steering part 34 is included in the locker element 30 (see below).

The flexibility may be improved even further when the first opening 14 extends in a horizontal direction so that the locker element 30 may slide in a horizontal direction when arranged in the first opening 14. This increases the flexibility without reducing the strength of the axial control means considerably.

Similarly, the flexibility may be improved further when the second opening 16 extends in a vertical direction so that the locker element 30 may slide in a vertical direction when arranged in the second opening 16. Particularly, it is advantageous when the first opening extends in one orientation and the second opening extends in another direction (such as horizontal and vertical, respectively), as this increases the acceptable radii considerably in addition to facilitate fitting of the holes between the flange of the member 2 and the locking element 30.

In one embodiment according to the invention, at least one first opening and at least one the second opening are connected to form a united opening. Such an opening may for example have an L-shaped, V-shaped or T-shaped opening and support two, three or more locking elements 30 during use. A united opening is advantageous in that it allows for simple manufacturing and a very high flexibility with regard to sliding of the locking elements prior to fastening of the fixture to the member.

Figure 4:
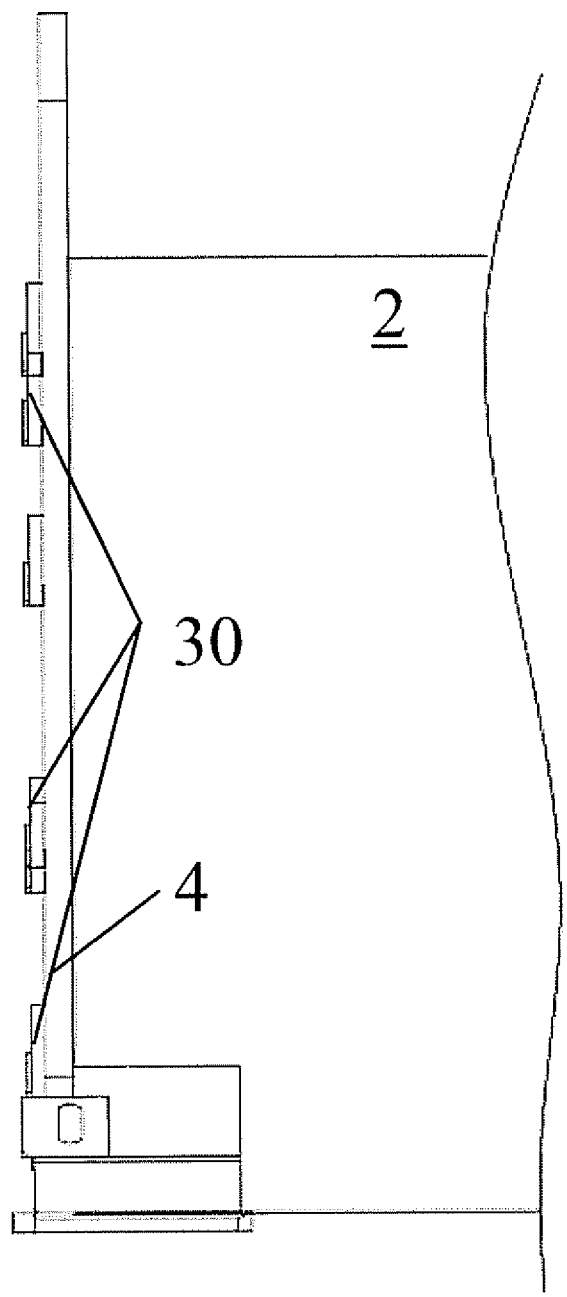
FIG. 4 shows the fixture of FIG. 3 connected to an end of a member.

Another embodiment of the fixture 4 according to the invention is shown in FIG. 3 and FIG. 4. In addition to the first opening 14 and the second opening 16 one or more further openings 17 are provided in the axial control means 6. Locker elements 30 may also be provided in one or more of the further openings 17. It is highly advantageous that all the locker elements are slideably arranged in the openings 14, 16, 17 but one or more of the locker elements may be arranged in an opening, which does not allow for sliding in the plane of the axial control means 6. The further opening(s) preferably extends in a further direction in the axial control means 6 so that the locker element(s) 30 may slide in the further opening in this further direction. To achieve more flexibility with regard to the shape of the member to be connected to the fixture, it is highly advantageous to have the further direction angled relative to the vertical and the horizontal directions during use of the fixture. Particularly, it is advantageous that the further direction is not parallel to the first direction and the second direction corresponding to the first opening and the second opening, respectively.

In a particularly advantageous embodiment of the fixture 4 in FIG. 3 and FIG. 4, the fixture 4 comprises at least two further openings 17. The most preferred number of openings depend in particular on the size of the axial control means 6 and two, three, four, five, six has been identified as particularly advantageous even though is some cases more further openings 17 will be suitable. At least one locker element 30 is slideably arranged in at least one of the further openings 17, and the further openings 17 preferably extend in at least two further directions in the axial control means (6), such as two, three, four or more further directions, so that the locker element(s) (30) arranged in one of the further openings (17) may slide in the further direction of the further opening wherein it is arranged. Particularly it has been found that the further direction advantageously can be angled relative to vertical and horizontal directions during use and more preferably at about 45° or 90° from the direction of the first direction and/or the second direction. The most preferred arrangement of the openings are when the first opening is arranged substantially horizontally, the second opening is arranged substantially vertically and the further openings are arranged at about ±45° relative to the first opening.

In FIG. 4, fixture 4 of the embodiment shown in FIG. 3 is shown in use. The end of the member 2 is connected to the fixture at the bottom of the axial control means 6 and in one or more of the other locker elements 30. It is observed that when utilising fixtures according to this aspect of the invention, connection to a frame may not need to utilize the locking fixture 60 to stabilize the member 2, however, it may be advantageous to secure the frame to the fixture by a locking fixture or a similar element to stabilize the frame in a vertical orientation.

Experimental work has shown that at least three bolts must be used for securing a wind turbine tower section to the fixture. Obviously more than three bolts may be utilised, but this would increase the time used to apply the fixture and hence three bolts, corresponding to three locker elements 30, are the preferred number. It is preferred that the at least three locker elements 30 are arranged slideably, and it is more preferred that the at least three locker elements are arranged in separate openings. Therefore, a highly preferred embodiment has at least two first openings 14 and/or at least two second openings 16. In FIG. 1 and FIG. 2, the most preferred embodiment is shown, namely having two horizontal openings and one vertical opening. This arrangement allows for a very high flexibility with regard to diameter of members having a substantially annular end and arrangement of holes in the flange of the member, but the flexibility is also very advantageous when the fixture is used for members having other end shapes.

The locker elements 30 may be secured to the axial control means 6 for example by having a washer on both sides of the axial control means 6 or by having a washer arranged in a slit inside the axial control means. However, it is preferred that the locker elements 30 are removably connected to the axial control means 6 as this allows for very high degree of flexibility and a more simple design.

To enhance the connection to the axial control means 6 it is highly advantageous if the locker element comprises a washer part 32. The washer part 32 is preferably arranged away from the member 2 during use. Furthermore, the washer part 32 should be wider than the first and/or the second opening 14, 16 to enhance the connection (see e.g. FIG. 2, FIG. 3 and FIG. 5).

One or more of the holes 36 of the locker element 30 may be equipped with a bushing 40 as shown in FIG. 2 to encompass different diameters of bolts to be used in fixing the locking element 30 to the member 2. It was found that the bushing approach allows for use of bolts in the range between M30 to M48.

To facilitate handling of the locking elements, a steering part 34 may advantageously be provided to fit into the first and second openings 14 and 16 of the axial control means. It was found that when the diameter of the steering part 34 was adapted to fit tightly but slideably into the opening 14, 16, the strength of the connection between the member 2 and the fixture 4 was enhanced. By fitting tightly is meant that the steering part has a clearance of less than about 4 mm, even though better results were realised for a clearance of less than about 2 mm. The best results were realised with a clearance of about 1 mm, however, smaller clearance may lead to the locking element being stuck in the opening 14, 16, which is highly undesirable.

Furthermore, it is found to be advantageous to increase the contact area between the wall of the openings 14, 16 and the steering part 34. In a preferred embodiment, the steering part 34 therefore comprises a number of parallel edges, preferably at least 3 sets of parallel edges, more preferably 4 or 5 sets of parallel edges, and most preferably the steering part has a regular hexahedron or octahedron cross section. This allows for increased strength of the connection while most of the flexibility in rotating the locker element 30 when fitting the holes 36 of the locker element 30 to the holes of the flange of the member 2 is preserved.

As previously discussed, the members to be connected to the fixture may be very heavy and to reduce the pressure exerted by the fixture on the ground, the fixture may advantageously comprise foot part 12, which is connected to the axial control member 6. The foot part 12 forms a substantially flat horizontal plane, which plane is the lowest part of the fixture 4 during use when the fixture is connected to the end of the member 2. As compared to the lowest part being a connector 10, the foot will reduce the pressure exerted by the fixture by typically a factor of 10-50.

Figure 7:
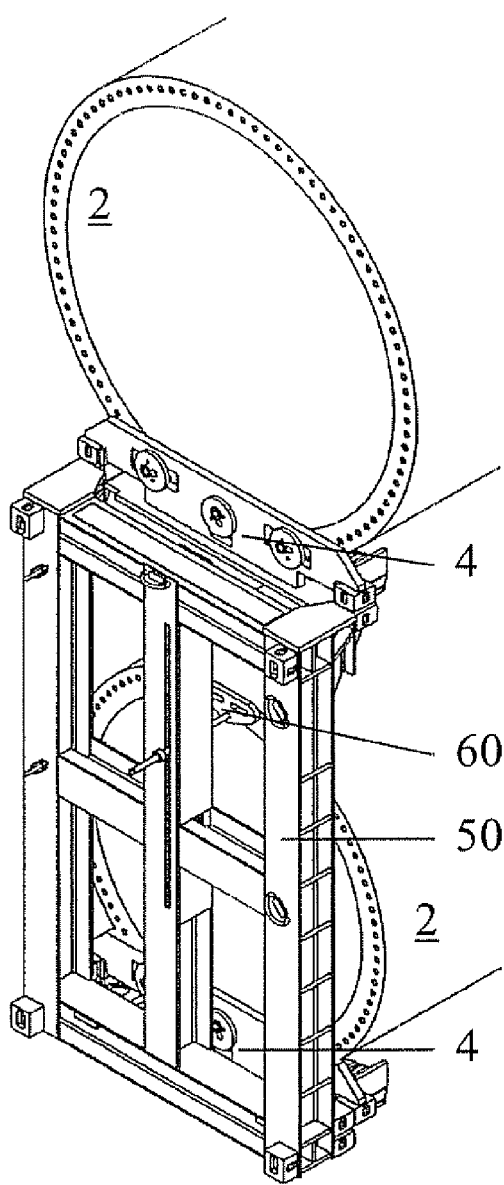
FIG. 7 shows two members connected to fixtures where the fixtures are connected to a frame.
Figure 7:
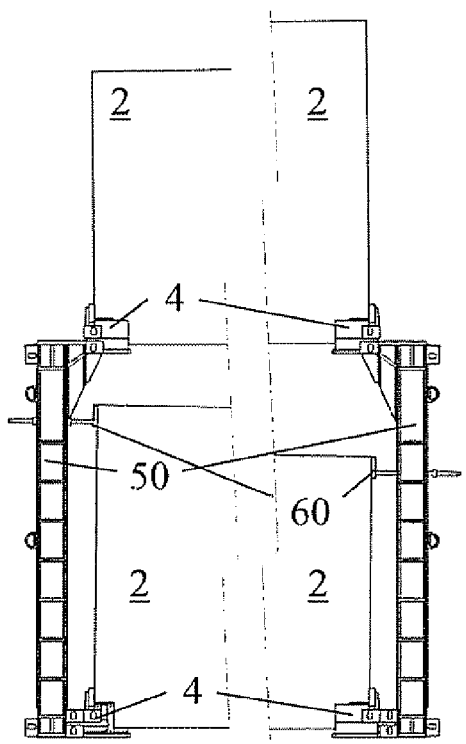
Figure 10:
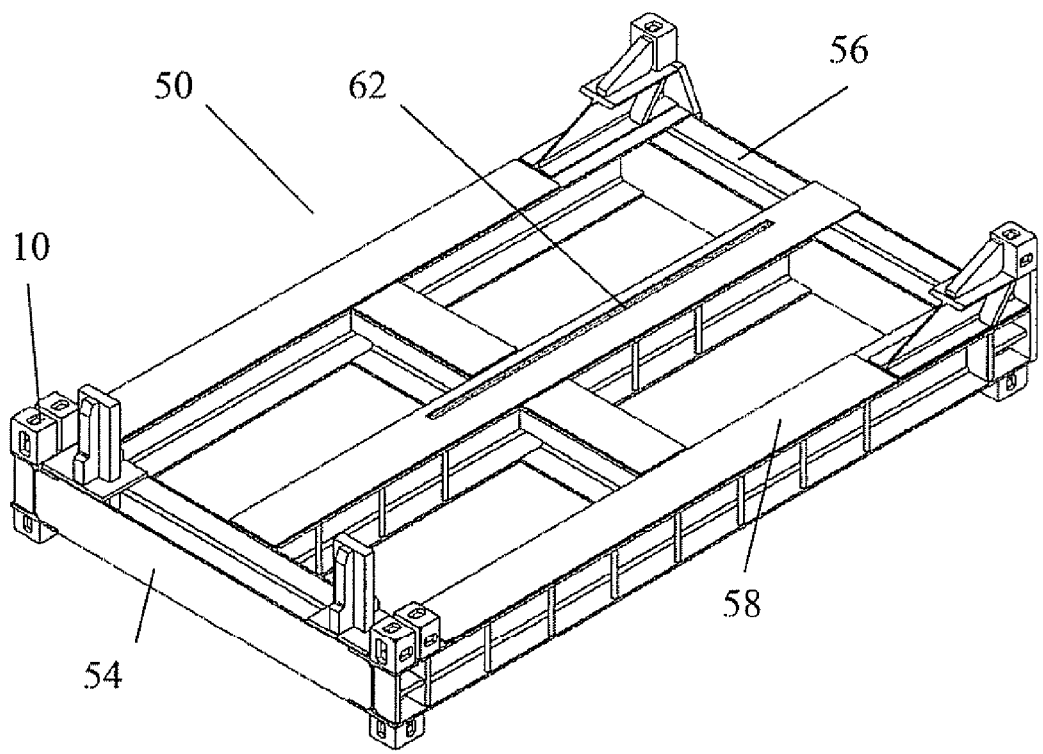
FIG. 10 shows a preferred embodiment of a frame.

For sea transportation it is typically allowed to load 100 tonnes in one position, and since the weight of the relevant members is in the order of 10 to 80 tonnes, it is typically advantageous to stack two or more members on top of each other. For this purpose, the invention is enhanced by a frame to be connected to the fixture according to the invention. The frame 50 is shown separated from the fixture in FIG. 10. The frame 50 has a first end part 54 (adapted to be downwards during use) and a second end part 56 (adapted to be upwards during use). The orientation of the frame during use is shown in FIG. 7A. The first end part and second end part are adapted to be connected to fixtures according to the invention. The connection preferably involves standard container corners, which may be engaged e.g. by standard twist locks or bridge couplings.

The first end part and the second end part of the frame 50 are separated by a distance larger than the diameter or height of the end of a member 2 to be gripped by the fixture 4 during use, such as 2.5 to 5 meters. This distance is kept by a rigid connection between the first end part and the second end part. The rigid connection is preferably realised by at least one connector spar 58. The frame 50 is further equipped with at least two external connectors 10 such as standard container corners arranged with a distance corresponding to a standard container, such as a 40 foot container, and preferably corresponding to the width of a standard container, such as a 40 foot container.

Figure 6:
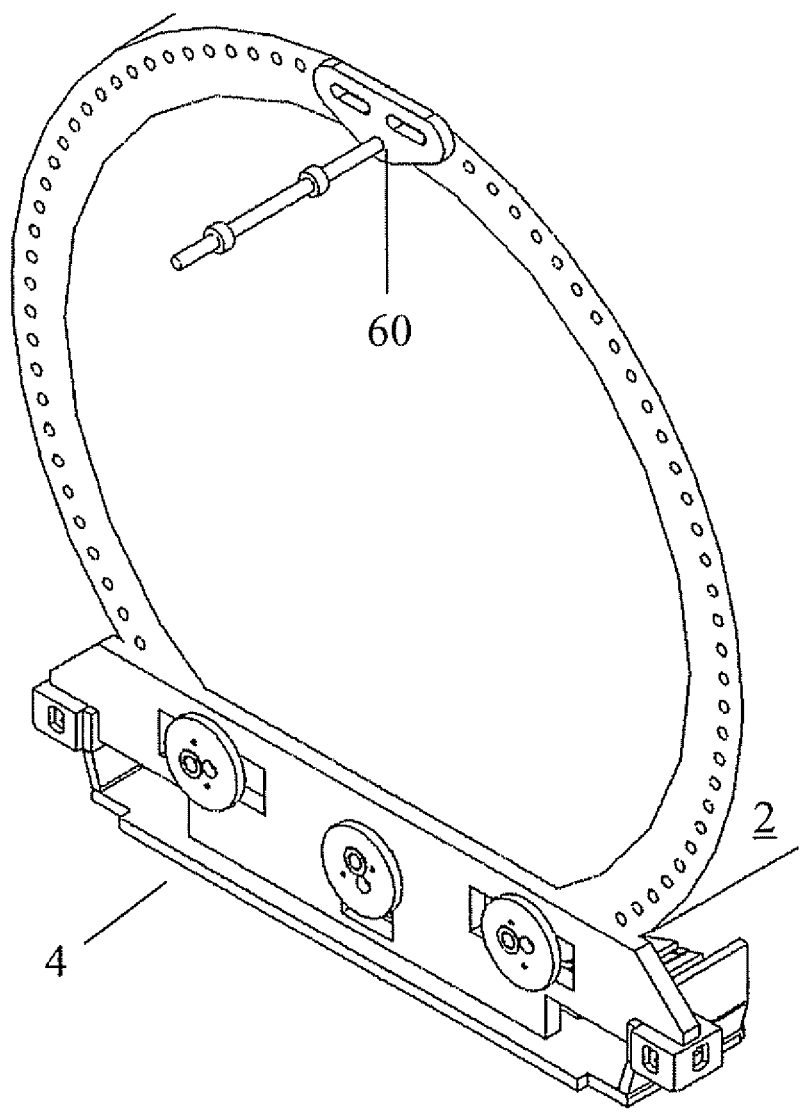
FIG. 6 shows a member arranged in the fixture and a locking fixture being connected to the member.
Figure 9:
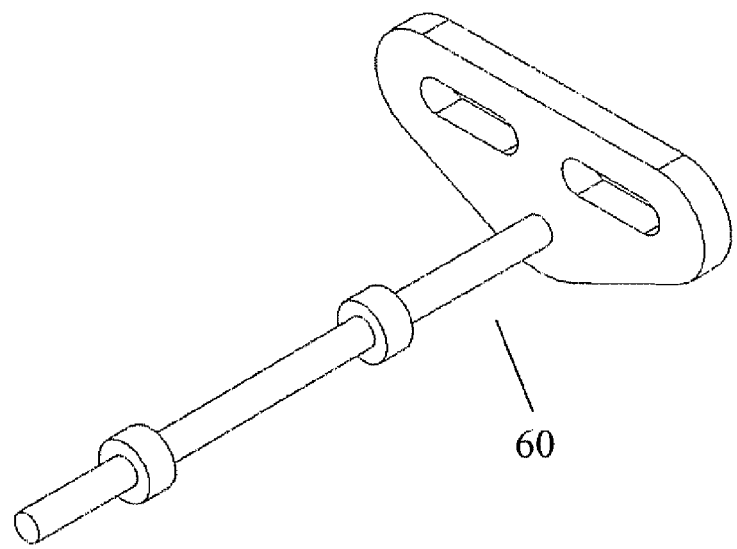
FIG. 9 shows a preferred embodiment of the locking fixture.

Finally, a through slit 62 is arranged in a spar between the first end part 54 and the second end part 56, the slit 62 extends a distance between the first end part 54 and the second end part 56, preferably, the slit 62 extends at least 50% or the distance between the first end part 54 and the second end part 62. The slit is utilised for receiving a locking fixture 60 so that the locking fixture 60 may slide along the length of the slit 62. The locking fixture 60 is shown in FIG. 9. It has a first end to be connected to the end of the member opposite of the fixture. In FIG. 6, the locking fixture is shown as engaged with the member. Bolts have been omitted for sake of clarity. The part to be connected to the member has elongated openings to receive the bolts. The openings are elongated to encompass the variation in flange design with respect to the positioning of the flange holes. The slit 62 in the frame 50 is preferably arranged towards the second end part 56 so as to allow for as large end size as possible. When installed, the locking fixture 60 is secured to the frame to enhance the securing of the member to the fixture and the frame as shown in FIG. 7A. When the fixture is used in connection with the frame, this typically involves two sets of frames and fixtures—one for each end of the member. This is particularly the case for wind turbine tower sections, where both ends have a substantially annular end. When a member has only one substantially annular end, another type of fixture should be utilised away from the substantially annular end.

The above described frame is particularly advantageous when the members have a substantially annular since the locking fixture easily may be adapted to the fit various annular diameters. However, similar frames may be utilised when transporting other types of members, having a more irregular shape. For example, the frame may be connected to a number of fixtures each being connected to a member. This may for example be the case when the members are parts of tower sections, such as ½, ⅓ or ¼ of the circumference of a section or sections of wind turbine blades having a non-annular end. In such cases, it may be necessary to stabilise the frame so that the frame is kept vertical during transportation. This may for example be performed by connecting the first end part of a first frame, which first frame is connected to the first end of the member, to the second end part of a second frame, which second frame is connected to the second end of the member, by a rigid beam. If this is repeated between the top (second end part) of the first frame to the bottom (first end part) of the second frame a rigid cross is formed along the member connected to the fixture and the frames are kept in a vertical position. Alternatively, the frame may be permanently connected to one or more of the fixtures, whereby the whole structure may be sufficiently rigid when the member is connected to the fixture. Fixtures of the type shown in FIG. 3 and FIG. 4 are particularly advantageous for gripping of irregular members due to the wide range of possible arrangements of the locker elements.

Figure 11:
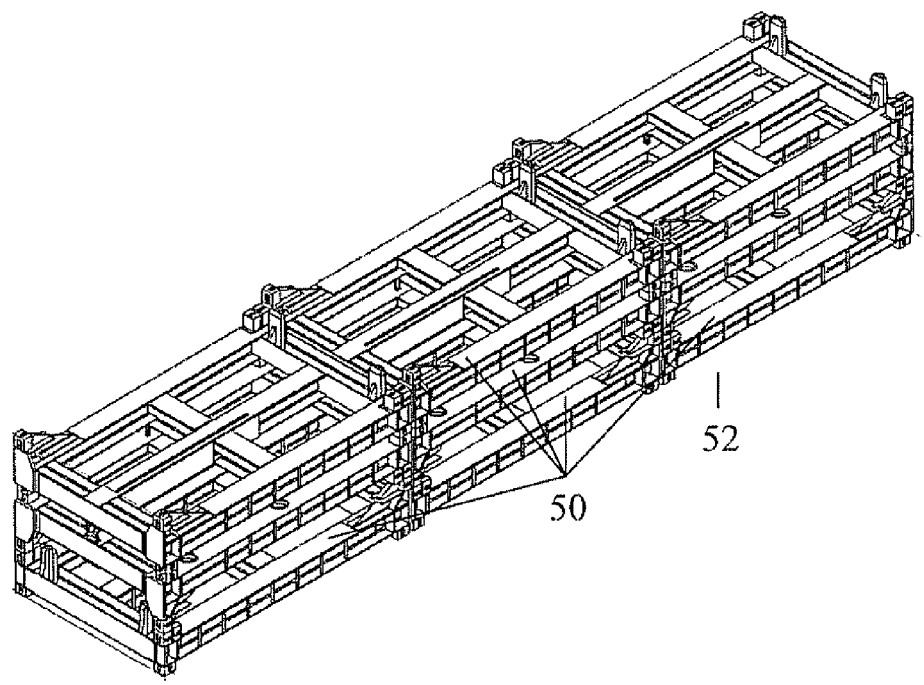
FIG. 11 shows a preferred embodiment of a frame unit.
Figure 12:
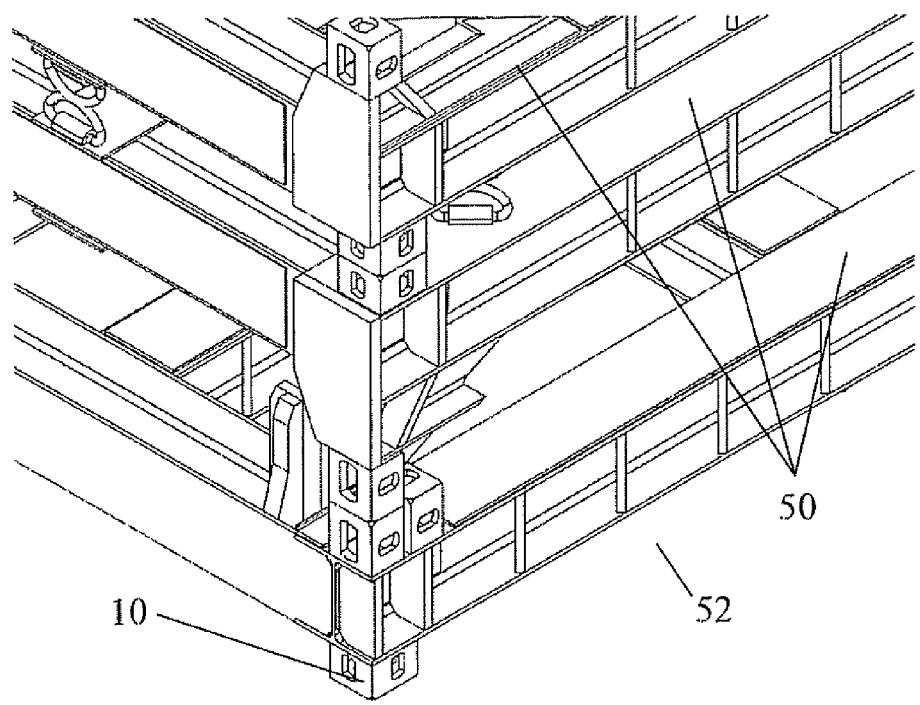
FIG. 12 shows a detailed view of the connection between frames in a frame unit.

The frame is primarily utilised in connection with sea transport. Hence, the frame may be dismounted in the harbour and need not be transported to the site of deployment of the member. This saves transporting of the extra mass of the frame and furthermore allows for additional flexibility with regard to choice of transportation means for other parts of the transportation. The frames are rather costly and may be recycled, however, the transportation back to the manufacturing plant has previously been costly since the frames could not be packed very efficiently. According to a highly preferred embodiment, the frame 50 is therefore adapted to be connected to further frames 50 to form a frame unit 52 as shown in FIG. 11 and FIG. 12. The connections to further frames 50 are preferably by twist locks or bridge couplings via standard container corners. In a preferred embodiment, the frame unit 52 should preferably have outer dimensions so that a number of frames and fixtures correspond to one or more standard containers. Therefore, it is highly preferred to design the frames so that the outer dimension of each frame is about a third of 12192 mm in height (when used with the fixture), about 2438 mm in width (i.e. the width of the first end part and the second end part. This allows for nine frames to be connected to form a frame unit 52 with suitable dimensions. However, other dimensions, which corresponds to frames being connected to form dimensions corresponding to other standard type of containers, such as for example 8, 15, 20 or 45 foot containers are also desired. Finally, the frame unit should have container corners arranged at least in equivalent positions as a standard container.

Wind turbine blades and root section flanges are manufactured with a wide variation in radii and flange design. The present invention is therefore highly advantageous for enhancing the handleability of wind turbine blades.

The wind turbine tower sections are rather difficult to handle, to transport and to stack due to the variation in diameter between the ends. This difficulty may be completely overcome by the fixture according to the invention due to the high degree of flexibility with regard to the radii of the annular end of the member.

Two tower sections may highly advantageously be arranged with the thick end of the first tower section together with the thin end of the second tower section as shown in FIG. 7B. The fixtures according to the present invention allow for a sufficient flexibility with regard to annular radius to adopt such variation.

Figure 8:
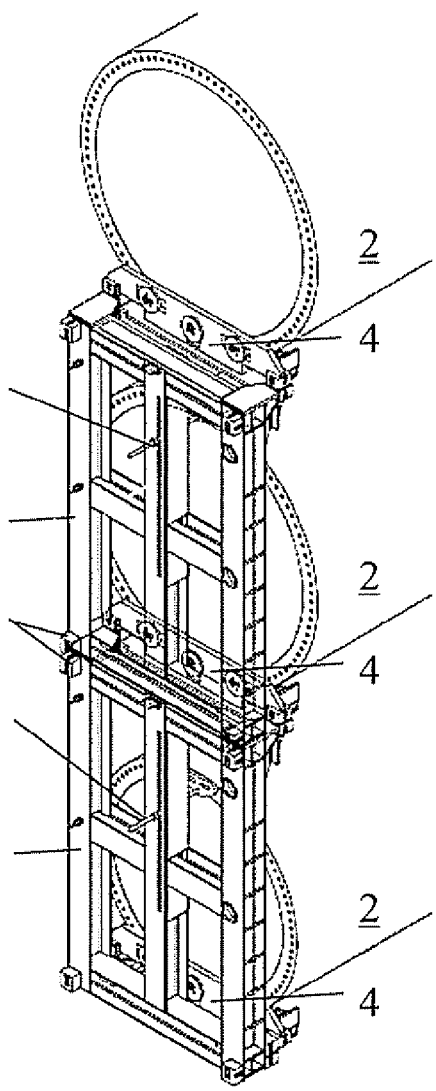
FIG. 8 shows three members connected to fixtures where the fixtures are connected to frames.
Figure 8:
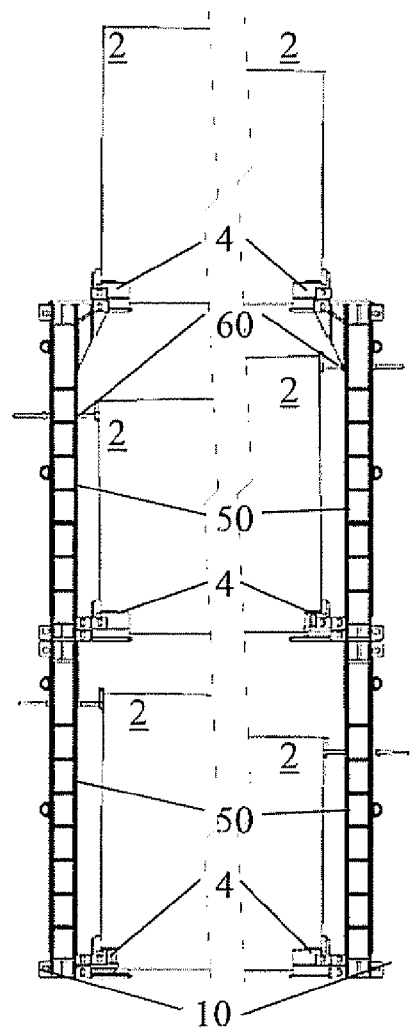

In FIGS. 7A and B, a stack with two fixtures (and hence two members) arranged one over the other via a frame is shown. However, in some cases, particularly when the members are relatively light or of very differing weight, more than two members may advantageously be arranged one over the others. Particularly, in a preferred embodiment, three or four layers of members are arranged on top of each other, but for relatively light members it may be relevant to arrange even more members on top of each other during transportation. In this case, each fixture and member may be arranged on separate frames or several fixtures may be arranged on each frame. Furthermore, two or more frames may be arranged on top of each other during use. During use, each layer of frames with fixtures and member(s) may be handled individually or several layers of frames may be connected when handled. The preferred handling depends on the size and weight of the members to be handled. In FIG. 8 shows an example of an arrangement with two frames 50 and three members 2 where each member 2 is fixed to fixture 4 according to the invention. In FIG. 8A, the area where the two frames 50 are connected is partially transparent. The connection between adjacent frames is preferably via the connectors 10, which are advantageously standard container corners, so that the frames may be temporarily fixed to one another by bridge couplings or twist locks. Similarly, the connection between the frames 50 and the fixtures 4 are also via connectors 10, preferably also being standard container corners, so that the frame 50 and the fixture 4 also may be secured by bridge couplings or twist locks. The members are tower sections having a slightly conical shape as shown in FIG. 8B and the flexible nature of the frame according to the invention easily allows for the difference in radius at the two ends for the same type of fixtures.

Typically, the fixture will be applied to the end of the member by positioning the fixture on a level surface, such as the ground, and thereafter position the member on the fixture near the desired position. This implies that the member will be positioned in contact with at least a part of the positioning means and within a distance from the axial control means which is reachable by the bolts or grapping mechanism to be used with the locking elements to secure the member relative to the fixture. Then the member is slid or rolled to the desired position as defined by the positioning means. This movement typically involves the use of gravity. Then the bolts or equivalent is fastened so as to move the member towards the final position relative to the axial control means and thereafter the bolts are secured. By this method, the position of the fixture during application and during use is substantially the same.

In another method of applying the fixture to the end of the member, the fixture is applied on the member for example on the side or top of the end part of the member, so that the orientation of the fixture during application and the subsequent use may be different. An example is if the fixture is arranged on top of a tower section lying on the ground. This corresponds substantially to FIG. 5 if put upside down. Similarly, the fixture may be applied on the side of a tower section. This type of application may be usable when the member is already lying on the ground, as it may be difficult to handle members of the relevant type without having a proper gripping mechanism arranged thereon. On the other hand, it should be observed that fixtures of the present type typically are relatively heavy and may weigh several hundred kilograms and therefore typically cannot be handled without mechanical aids.

An individual feature or combination of features from an embodiment of the invention described herein, as well as obvious variations thereof, are combinable with or exchangeable for features of the other embodiments described herein, unless the person skilled in the art would immediately realise that the resulting embodiment is not physically feasible.

TABLE OF IDENTIFICATION

2 End of a member
4 Fixture
6 Axial control means
8 Cross-positioning means
9 Further part
10 External connector
12 Foot part
14 First opening
16 Second opening
17 Further opening
30 Locker element
32 Washer part
34 Steering part
36 Hole
40 Bushing
50 Frame
52 Frame unit
54 First end part
56 Second end part
58 Connector spar
60 Locking fixture
62 Slit

The invention claimed is:

1. A fixture for gripping an end of a member, such as a wind turbine tower section, a wind turbine blade or a wind turbine hub, the fixture comprising:
   an axial control means for preventing horizontal movement of the end of the member relative to the fixture in a direction orthogonal to the end of the member during use,
   a cross-positioning means for positioning the end of the member relative to the fixture during application of the fixture to the end of the member with regard to a direction corresponding to a horizontal direction parallel to the end of the member during use,
   at least two connectors adapted for connecting the fixture to an external structure other than the end of the member,
   a first opening arranged in the axial control means,
   a second opening arranged in the axial control means, and
   at least two locker elements slideably arranged in the first and second openings, the locker elements comprising at least one through hole.

2. The fixture according to claim 1, wherein the axial control means is a substantially flat plate arranged parallel to the end of the member during use.

3. The fixture according to claim 1, wherein at least one of said locker elements comprises at least two through holes.

4. The fixture according to claim 1, wherein at least one of the holes of said locker element is arranged asymmetrically in the locker element.

5. The fixture according to claim 1, wherein the locker element comprises a washer part arranged away from the substantially annular end of the member during use, the washer part being wider than the first and the second openings.

6. The fixture according to claim 1, wherein the first opening extends in a first direction in the axial control means so that the locker element arranged in the first opening may slide in the first direction.

7. The fixture according to claim 1, wherein the second opening extends in a second direction in the axial control means so that the locker element arranged in the second opening may slide in the second direction.

8. The fixture according to claim 1, wherein the fixture comprises at least two first openings and/or at least two second openings.

9. The fixture according to claim 1, wherein the fixture comprises at least one further opening and a locker element slideably arranged therein, and said further opening extends in a further direction in the axial control means so that the locker element arranged in the further opening may slide in the further direction.

10. The fixture according to claim 1, wherein the fixture comprises at least two further openings, and at least one locker element slideably arranged in at least one of the further openings, and said further openings extend in at least two further directions in the axial control means, so that the at least one locker element arranged in one of the further openings may slide in the further direction of the further opening wherein it is arranged.

11. The fixture according to claim 1, wherein the locker element is removably connected to the axial control means.

12. The fixture according to claim 1, wherein at least one of the locker elements comprises a steering part adapted to fit tightly but slideably into the first opening or the second opening.

13. The fixture according to claim 12, wherein the steering part comprises a number of parallel edges.

14. The fixture according to claim 1, wherein the cross-positioning means is adapted to position the end of the member relative to the fixture by means of gravity during use.

15. The fixture according to claim 1, wherein the cross-positioning means comprises two slides, said two slides facing downwards towards the desired position of the fixture so that during application of the fixture, the end of the member will be in the desired position relative to the fixture when connected to the two slides.

16. The fixture according to claim 1, wherein the cross-positioning means comprises two protruding members arranged with a horizontal distance and facing towards the end of the member during use so that during application of the fixture, the end of the member will be in the desired position relative to the fixture when connected to the two protruding members.

17. The fixture according to claim 1, wherein the cross-positioning means comprises a coating.

18. The fixture according to claim 1, further comprising a foot part connected to the axial control means and forming a substantially flat horizontal plane, which plane is the lowest part of the fixture when the fixture is connected to the end of the member during use.

19. The fixture according to claim 1, wherein the at least two connectors are standard container corners, and the connectors are arranged separated by a distance corresponding to a standard used in transportation or handling of containers.

20. The fixture according to claim 1, connected to a frame, wherein the frame comprises a first end part and a second end part,
said first end part and second end part being adapted to being at least temporarily connected to the fixture,
the first end part and the second end part being separated by a distance larger than the diameter of an end of a member to be gripped by the fixture during use, and
the first end part and the second end part being connected rigidly by at least one connector spar,
at least two external connectors arranged with a distance corresponding to a standard used in transportation or handling of containers, and
a through slit arranged in a spar between the first end part and the second end part, the slit extending a distance between the first end part and the second end part, the slit being adapted for receiving a locking fixture arranged slideably in the slit.

21. The fixture according to claim 20, wherein the frame is detachable from the fixture.

22. The fixture according to claim 21, wherein the frame is adapted to be connected to further frames to form a frame unit, said frame unit having outer dimensions corresponding to a standard container and said frame unit further having standard container corners arranged at least in equivalent positions as a standard container.

23. A frame comprising:
a first end part and a second end part,
said first end part and second end part being adapted to being at least temporarily connected to a fixture,
the first end part and the second end part being separated by a distance larger than the diameter of an end of a member to be gripped by the fixture during use, and the first end part and the second end part being connected rigidly by at least one connector spar,
at least two external connectors arranged with a distance corresponding to a standard used in transportation or handling of containers, and
a through slit arranged in a spar between the first end part and the second end part, the slit extending at least 50% of the distance between the first end part and the second end part, the slit being adapted for receiving a locking fixture arranged slideably in the slit, whereby the fixture comprises:
an axial control member for preventing horizontal movement of the end of the member relative to the fixture in a direction orthogonal to the end of the member during use,
a cross-positioning member for positioning the end of the member relative to the fixture during application of the fixture to the end of the member with regard to a direction corresponding to a horizontal direction parallel to the end of the member during use,
at least two connectors adapted for connecting the fixture to an external structure other than the end of the member,
a first opening arranged in the axial control member,
a second opening arranged in the axial control member, and
at least two locker elements slideably arranged in the first and second openings, the locker elements comprising at least one through hole.

24. The frame according to claim 23, wherein the frame is adapted to be connected to further frames to form a frame unit, said frame unit having outer dimensions corresponding to a standard container and said frame unit further having container corners arranged at least in equivalent positions as a standard container.

25. A method of using a fixture for gripping the end of a wind turbine tower section during handling or transportation, comprising:
providing a fixture, the fixture comprising:
an axial control means for preventing horizontal movement of the end of the tower section relative to the fixture in a direction orthogonal to the end of the tower section during use,
a cross-positioning means for positioning the end of the tower section relative to the fixture during application of the fixture to the end of the tower section with regard to a direction corresponding to a horizontal direction parallel to the end of the tower section during use,
at least two connectors adapted for connecting the fixture to an external structure other than the end of the tower section,
a first opening arranged in the axial control means,
a second opening arranged in the axial control means, and
at least two locker elements slideably arranged in the first and second openings, the locker elements comprising at least one through hole,
coupling the fixture to the end of the wind turbine tower section; and
gripping the fixture during handling or transportation of the wind turbine tower section.

26. A method of using a fixture for gripping the end of a wind turbine blade during handling or transportation, comprising:
providing a fixture, the fixture comprising:
an axial control means for preventing horizontal movement of the end of the blade relative to the fixture in a direction orthogonal to the end of the blade during use,
a cross-positioning means for positioning the end of the turbine blade relative to the fixture during application of the fixture to the end of the blade with regard to a direction corresponding to a horizontal direction parallel to the end of the blade during use,
at least two connectors adapted for connecting the fixture to an external structure other than the end of the blade,
a first opening arranged in the axial control means,
a second opening arranged in the axial control means, and
at least two locker elements slideably arranged in the first and second openings, the locker elements comprising at least one through hole,
coupling the fixture to the end of the wind turbine blade; and
gripping the fixture during handling or transportation of the wind turbine blade.

27. The method according to claim 25, further comprising sliding the at least two locker elements within the first and second openings so that the at least one through hole in the at least two locker elements align with corresponding holes in the wind turbine tower section.

28. The method according to claim 26, further comprising sliding the at least two locker elements within the first and second openings so that the at least one through hole in the at least two locker elements align with corresponding holes in the wind turbine blade.

\* \* \* \* \*